United States Patent [19]
Yanagisawa et al.

[11] Patent Number: 5,381,391
[45] Date of Patent: Jan. 10, 1995

[54] OPTICAL RECORDING MEDIUM HAVING A THIRD NON-LINEAR OPTICAL REFLECTION FILM

[75] Inventors: Takuma Yanagisawa; Seiichi Ohsawa, both of Tsurugashima, Japan

[73] Assignee: Pioneer Electronic Corporation, Tokyo, Japan

[21] Appl. No.: 125,294

[22] Filed: Sep. 22, 1993

[30] Foreign Application Priority Data

Sep. 25, 1992 [JP] Japan .................. 4-256703

[51] Int. Cl.⁶ .............................. G11B 13/00
[52] U.S. Cl. .................. 369/14; 369/275.1; 369/275.3
[58] Field of Search .............. 369/14, 15, 272, 273, 369/275.1, 275.3, 275.4, 276; 428/694 R

[56] References Cited

U.S. PATENT DOCUMENTS

| | | | |
|---|---|---|---|
| 4,509,161 | 4/1985 | Van de Leest et al. | 369/275.3 |
| 5,249,175 | 9/1993 | Akahira et al. | 369/275.1 |
| 5,274,623 | 12/1993 | Usami et al. | 369/275.1 |
| 5,276,673 | 1/1994 | Kobayashi et al. | 369/275.3 |

FOREIGN PATENT DOCUMENTS 60-160036  8/1985  Japan ........................... 369/14

*Primary Examiner*—Robert J. Pascal
*Assistant Examiner*—Tan Dinh
*Attorney, Agent, or Firm*—Perman & Green

[57] ABSTRACT

An optical disk having two transparent and a refelection film. The reflection film is made of a non-linear optical material in which reflectance increases according to intensity of incident light thereto. The reflection film has a multiple reflectance.

2 Claims, 2 Drawing Sheets

OPTICAL RECORDING MEDIUM HAVING A THIRD NON-LINEAR OPTICAL REFLECTION FILM

BACKGROUND OF THE INVENTION

1. Field of the Invention

The present invention relates to an optical disk or a disk-shaped recording medium in which reflected light from it is utilized in order to reproduce signal information recorded thereon.

2. Description of the Related Art

Pits corresponding to signal information to be stored are formed in the optical disk such a compact disk (CD) or a video disk. In an optical disk player reproducing the signal from the optical disk, a laser beam is focused as a spot on pits or non-pit portions and then a change in the intensity of the reflected light therefrom is detected by its photodetector to reproduce the recorded signals. The optical detection system in this optical disk player has a limitation on the cutoff spatial frequency 2 NA/$\lambda$ (wherein NA represents the numerical aperture of the objective lens; and $\lambda$ represents the wavelength of the laser beam). To improve the spatial resolution to thereby increase the surface density of the recording film, it is essential to increase the numerical aperture of the objective lens and shorten the wavelength of the laser beam.

As an example of an optical disk player designed to improve the spatial resolution, there has been proposed an apparatus which employs apodization or super resolution (as disclosed in Japanese Patent Application koukai No.2-12625/1990). The optical irradiation system in this optical disk player decreases the light intensity near the center of the entrance pupil of a read laser beam by using a light-shielding plate before forming the spot of a diffraction pattern on the surface of an optical disk. This optical irradiation system utilizes a main lobe of a small diameter size in the light intensity distribution of the apodization spot formed on the optical disk.

In case such a light intensity distribution of the spot is taken into consideration, there may be offered an optical disk comprising a reflection layer made of a phase changing material such as SbSe with a temperature-on-reflectance dependency such that the reflectance increases in accordance with an increase of temperature by the irradiation of the laser beam.

Such an optical disk has a characteristic of repetition of reading data which is restricted in the repeating numbers of reading, because the reflection layer of phase changing material changes in its molecular structure by the irradiation of the laser beam. Generally, it is desired optical materials having a high response speed to the irradiation of the laser beam.

SUMMARY OF THE INVENTION

It is therefore an object of the present invention to provide an optical disk has a reflection layer of a high light-intensity-on-reflectance dependency which is property that reflectance greatly increases according to an increment of intensity of the incident light thereto.

The optical disk according to the present invention comprises;

a first transparent film;

a reflection film layered on said first transparent film and carrying pits as recording portions; and a second transparent film layered on said reflection film;

wherein said reflection film is made of a third non-linear optical material with a light-intensity-on-reflectance dependency such that its reflectance increases according to an increment of intensity of an incident light thereto, and having a refractive index $n_{II}$ represented by the following equation 1:

$$n_{II} = n_0 + n_2 I_{in} \qquad (1)$$

where $n_0$ is a linear refractive index of the third non-linear optical material, $n_2$ is a non-linear refractive index of the third non-linear optical material, and $I_{in}$ is a light intensity in a main lobe of a diffraction pattern formed on said reflection film by said incident light;

the reflection film having a multiple-reflectance R represented by the following equation 2:

$$\begin{aligned}
R &= \left| \frac{r_1 - r_2 \cdot \exp(-i\epsilon)}{1 - r_1 \cdot r_2 \cdot \exp(-i\epsilon)} \right|^2 \\
r_1 &= \frac{n_I - n_{II}}{n_I + n_{II}} \\
r_2 &= \frac{n_{II} - n_{III}}{n_{II} + n_{III}} \\
\epsilon &= 4\pi \cdot \frac{h}{\lambda} \cdot n_{II} = 4\pi \cdot \frac{h}{\lambda} \cdot (n_0 + n_2 I_{in}) \\
\therefore R &= R\left(I_{in}, \frac{h}{\lambda}\right)
\end{aligned} \qquad (2)$$

where $r_1$ is a first Fresnel's amplitude reflectance in the interface between the first transparent film and the reflection film, $r_2$ is a second Fresnel's amplitude reflectance in the interface between the reflection film and the second transparent film, $n_I$ is a first refractive index of the first transparent film, $n_{III}$ is a second refractive index of the second transparent film, h is a thickness of the reflection film, and $\lambda$ is a wavelength of said incident light; and said reflection film having the thickness h satisfying the following inequalities:

$$\frac{dR\left(I_{in}, \frac{h}{\lambda}\right)}{dI_{in}} \geq 0$$

$$I_e \leq I_{in} \leq I_0$$

where $I_0$ and $I_e$ are center and peripheral intensities of said main lobe respectively.

This optical disk according to the present invention can achieves to provide a high light-intensity-on-reflectance dependency such that its reflectance greatly increases according to an increment of intensity of the incident light thereto.

BRIEF DESCRIPTION OF THE DRAWINGS

The features of the present invention that are believed to be novel are set forth with particularity in the appended claims. The invention, together with other objects and advantages thereof, may best be understood by reference to the following description of the presently preferred embodiments together with the accompanying drawings in which:

DETAILED DESCRIPTION OF THE PREFERRED EMBODIMENT

A preferred embodiment of the present invention will now be described referring to the accompanying drawings.

Figure 1:
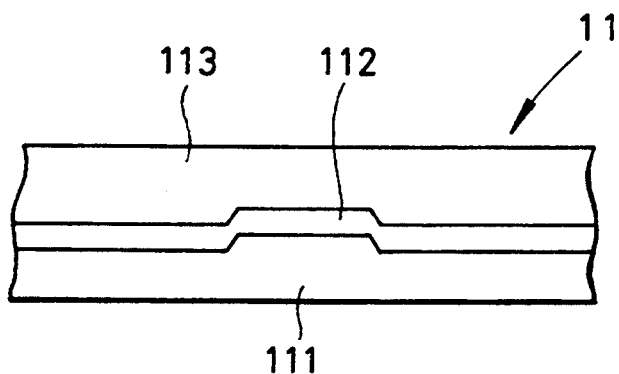
FIG. 1 is a partly enlarged cross sectional view of an optical disk according to the present invention.

As shown in FIG. 1, an optical disk 11 comprises a protection film 111 as the first transparent film, a reflection film 112 and a substrate 113 as the second transparent film in which pits P as the information recording portions are formed on the substrate 113 and the reflection film. The reflection film 112 has a light-intensity-on-reflectance dependency such that the reflectance increases gradually in accordance with an increment in the intensity of incident light.

Figure 2:
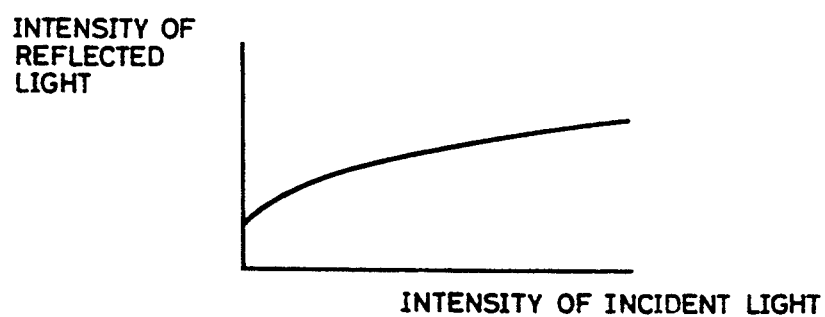
FIG. 2 presents graphs showing the light-intensity-on-reflectance dependency of an optical disk without controlling of the thickness of its reflection film.

FIG. 2 shows a light-intensity-on-reflectance dependency characteristic of the reflection film 112. This characteristic shown in FIG. 2 indicates that the reflectance R increases gradually in a logarithmic form as the incident light intensity $I_{in}$ increases. Examples of the material for the reflection film 112, which shows the light-intensity-on-reflectance dependency, are third non-linear optical materials such as a-Si (amorphous Silicon) or InSb (Indium-Stibium). The characteristic in FIG. 2 can be treated as a linear characteristic in the light intensity range of the laser beam for reading pits. The third non-linear optical material have a property such that the reflectance change is about 10% with a response time of $10^{-8}$ to $10^{-12}$ second, on the order of nanoseconds. The third non-linear optical material further provides a repetition characteristic such that the number of repetitions for reading pits is as high as close to infinity, because those materials do not have an optical-response originated change in the substance structure in the repetitive characteristic as compared with a photochromic material or a phase changing material.

A further detailed description for the reflection film made of the third non-linear optical material with a light-intensity-on-reflectance dependency characteristic will now be given hereinafter.

Generally, the phenomenon that injection of an intense electric field, such as a laser beam, causes polarization in a substance and this polarization is proportional to the electric field is called "linear optical response". An optical response which is not proportional to an electric field but responds to the power of an electric field is called "non-linear optical response". In general, polarization P in a substance caused by the injection of an intense electric field is expressed by the following equation 3:

$$P = \epsilon_0(\chi^{(1)}E + \chi^{(2)}E^2 + \chi^{(3)}E^3 + \ldots) \quad (3)$$
$$= \epsilon_0\chi^{(1)}E + P^{NL}$$

where $\epsilon_0$ is a dielectric constant in vacuum; E is the photoelectric field of a laser beam; and $\chi^{(i)}$ (i=1, 2, 3, ...) indicates an electric susceptibility expressed by second, third or more tensor. The first term in the upper portion of the equation indicates linear polarization representing a linear polarization optical response, and the second term and thereafter indicates non-linear polarization $p^{NL}$. The electric susceptibilities $\chi^{(2)}$, $\chi^{(3)}$, ... are also called the second, third and more order of non-linear electric susceptibilities respectively.

Linear polarization indicates the isotropy and anisotropy of a substance, and second non-linear polarization indicates the SHG effect or EO effect as the index of refraction is changed by an electric field. Third non-linear polarization indicates the Kerr effect which is a phenomenon that the refractive index and the absorption coefficient changes according to a change in light intensity, thus changing the reflectance, transmittance and absorption ratio. The term "third non-linear optical material⇌ is meant for an optical material which has a large third non-linear susceptibility. For instance, a-Si has a third non-linear susceptibility of about $10^{-3}$ esu and InSb has a third non-linear susceptibility of about $10^{-4}$ esu.

The refractive index n of the third non-linear optical material is generally expressed by the following equation 4, when the laser beam has a light intensity $I_{in}$:

$$n = n_0 + n_2 I_{in}$$
$$n_2 = 10^7 \times 16\pi^2 \chi^{(3)}/cn_0^2 \quad (4)$$

where $n_0$ is a linear refractive index; $n_2$ is a non-linear refractive index; and c is the speed of light in vacuum. The unit for the non-linear refractive index $n_2$ is cm$^2$/W.

The reflectance $R_1$ of the reflection film made of a third non-linear optical material is a function of the light intensity $I_{in}$, because the reflectance $R_1$ is expressed by an equation 5 below:

$$R_1 = |n_{II} - n_{III}|^2 / |n_{II} + n_{III}|^2 \quad (5)$$

where $n_{II}$ is a refractive index of the reflection film 112; and $n_{III}$ is a refractive index of the substrate 113.

Thus, FIG. 2 shows such a reflectance $R_1$ of the in an light-intensity-on-reflectance dependency characteristic in an optical disk having the reflection film made of a third non-linear optical material.

Inventors furthermore take account of not only the interface between the substrate 113 and the reflection film 112 but also the interface between the reflection film 112 and the protection film 111, and reveal that the intensity of reflected light increases by using the controlling of the thickness of the reflection film 112 based on interference of the reflected light through a multi-layer thin film or the principle of multiple reflection.

Assume that, in the optical disk 11 comprising the protection film 111 of the first transparent film, the reflection film 112 and the substrate 113 of the second transparent film which are layered subsequently as shown in FIG. 1, the reflection film being irradiated by a laser beam through the first transparent film and then a light spot having an intensity distribution presented by a Bessel function is formed on the surface;

the Fresnel's amplitude reflectance in the interface between the protection film 111 and the reflection film 112 is $r_1$;

the Fresnel's amplitude reflectance in the interface between the reflection film 112 and the substrate 113 is $r_2$;

the refractive index of the protection film 111 is $n_I$;
the refractive index of the reflection film 112 is $n_{II}$;
the refractive index of the substrate 113 is $n_{III}$;
the thickness of the reflection film 112 is h; and
the wavelength of incident laser beam is $\lambda$; then the reflection film has the multiple-reflectance R represented by the following equation 6:

$$R = \left| \frac{r_1 - r_2 \cdot \exp(-i\epsilon)}{1 - r_1 \cdot r_2 \cdot \exp(-i\epsilon)} \right|^2 \quad (6)$$

$$r_1 = \frac{n_I - n_{II}}{n_I + n_{II}}$$

$$r_2 = \frac{n_{II} - n_{III}}{n_{II} + n_{III}}$$

$$\epsilon = 4\pi \cdot \frac{h}{\lambda} \cdot n_{II} = 4\pi \cdot \frac{h}{\lambda} \cdot (n_0 + n_2 I_{in})$$

$$\therefore R = R\left(I_{in}, \frac{h}{\lambda}\right)$$

In this way, the multiple-reflectance R of the reflection film is a function of the light intensity of the incident laser beam $I_{in}$, the thickness h of the reflection film 112 and the wavelength $\lambda$ of the incident laser beam.

Figure 4A:
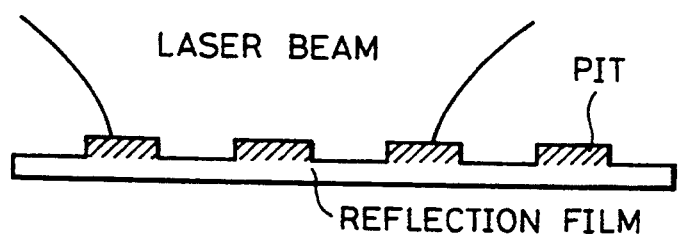
FIGS. 4A, 4B and 4C are schematic diagrams for explaining a status of reading a pits of an optical disk according to the present invention, including a partly enlarged cross sectional view (4A) of the optical disk irradiated by an incident laser beam, and graphs of the intensity distributions of the incident laser beam (4B) and the reflected light (4C) respectively.
Figure 4B:
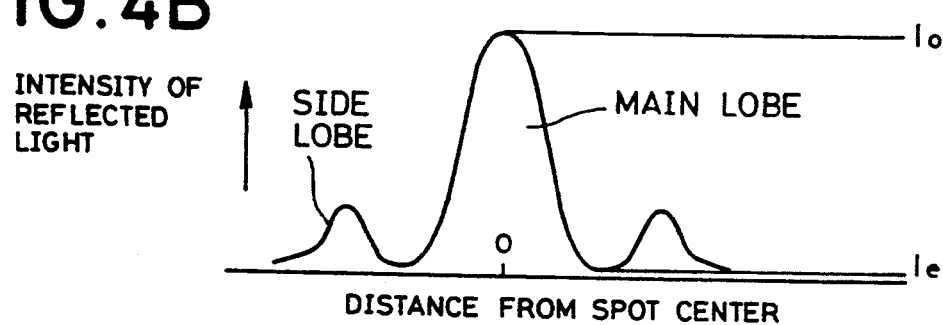

Therefore, in the case that the spot of the main lobe in the light intensity distribution is formed on the optical disk, a high multiple-reflectance is obtained by setting a pertinent thickness of the reflection film 112 in such a manner that the increment of the multiple-reflectance R usually becomes positive in the range from the center intensity $I_0$ to the peripheral intensity $I_e$ of the spot (main lobe) as shown in FIG. 4B. In other words, It is preferable to form an optical disk comprising the reflection film made of a third non-linear optical material having the thickness represent by the following inequalities 7:

$$\frac{dR\left(I_{in}, \frac{h}{\lambda}\right)}{dI_{in}} \geq 0 \quad (7)$$

$$I_e \leq I_{in} \leq I_o$$

In this way, the increase of the multiple-reflectance of the reflection film in the light spot is achieved by setting of the conditions of the thickness h of the reflection film satisfying the relationship represented by the formulae (6) and (7). Thus, FIG. 3 shows such a multiple-reflectance R of the light-intensity-on-reflectance dependency characteristic of an optical disk comprising the reflection film made of a third non-linear optical material having the particular thickness.

Figure 3:
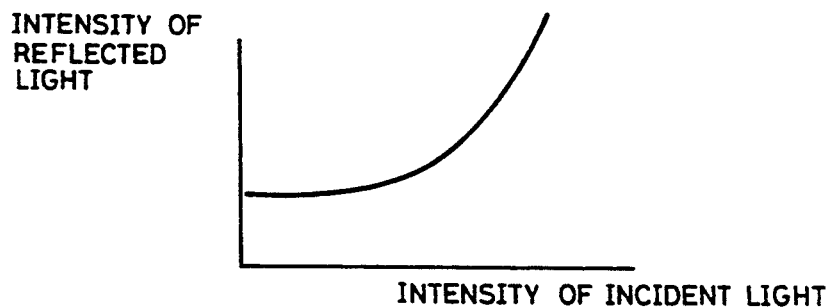
FIG. 3 presents graphs showing the light-intensity-on-reflectance dependency of an optical disk with controlling of the thickness of its reflection film according to the present invention.

For example, when the conditions of the optical disk are set up as follows:

$n_I = 1.0$ $n_{II} = n_0 + n_2 I_{in} = 2.5 + 10^{-5} I_{in}$ $n_{III} = 1.5$ $I_e = 0 (W/cm^2)$ $I_0 = 10^5 (W/cm^2)$ and the conditions of the incident laser beam is $h/\lambda = 0.1$, then the multiple-reflectance R of the reflection film in the light spot changes by 30% or more as shown in FIG. 3. On the other hand, when the principle of the multiple-reflection is not used for the optical disk, the reflectance $R_1 = |r_2|^2$ of the reflection film in the light spot changes only by 22% as shown in FIG. 2.

Figure 4C:
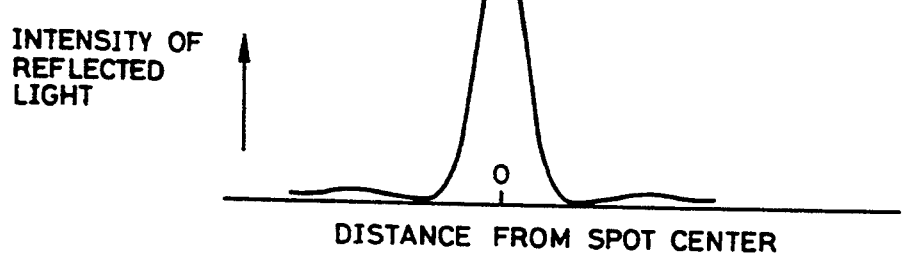

Assume that a laser beam is irradiated on the optical disk as shown in FIG. 4A and then the spot of a diffraction pattern with side lobes in the light intensity distribution which is expressed by Bessel function as shown in FIG. 4B, the reflected light from the pit of the disk has an intensity distribution in which its radius is smaller than that of main lobe of the incident laser beam as shown in FIG. 4C, i.e., the intensity of the reflected light from the pit for the side-lobe components significantly decreases as compared with the intensity of the reflected light from the main lobe.

In other words, even with a plurality of pits present in a spot as shown in FIG. 4A, only that pit which has an increased reflectance in accordance with the intensity $I_0$ of the center of the diffraction pattern is detected, and other pits around that pit will not be detected due to a smaller amount of reflected light. Accordingly, the side-lobe oriented crosstalk increases and the apparent effective spot diameter becomes smaller, thus information recording with a high recording surface density is accomplished.

When the optical disk having a reflection film made of a third non-linear optical material having the specific thickness was prepared, then its optical transfer function (OTF) was measured. The cutoff spatial frequency in this case stretches to a higher frequency side than that in the conventional case, which shows that information can be recorded with a high recording surface density.

As described above, the optical disk according to the present invention comprises a reflection film made of a third non-linear optical material having the specific thickness. Therefore, the optical disk can suppress the influence of side lobes of an irradiated spot on the reflected light therefrom even if the incident light spot includes large side lobes, since the reflected light due to the side lobes can be eliminated efficiently. The degree of the modulation of the reproduced signal is improved at the high-frequency component of the spatial frequency. As a result, when an optical disk is played in the optical disk player, the signal output of its photosensor increases in a high-frequency band. The optical disk is able to carry information at high density and eliminating the crosstalk component.

What is claimed is:

1. An optical disk comprising;
  a first transparent film;
  a reflection film layered on said first transparent film and carrying pits as recording portions; and
  a second transparent film layered on said reflection film;
  wherein said reflection film is made of a third non-linear optical material with a light-intensity-on-reflectance dependency such that its reflectance increases according to an increment of intensity of an incident light thereto, and having a refractive index $n_{II}$ represented by the following equation 1:

$$n_{II} = n_0 + n_2 I_{in} \qquad (1)$$

where $n_0$ is a linear refractive index of the third non-linear optical material, $n_2$ is a non-linear refractive index of the third non-linear optical material, and $I_{in}$ is a light intensity in a main lobe of a diffraction pattern formed on said reflection film by said incident light;

the reflection film having a multiple-reflectance R represented by the following equation 2:

$$\left. \begin{array}{l} R = \left| \dfrac{r_1 - r_2 \cdot \exp(-i\epsilon)}{1 - r_1 \cdot r_2 \cdot \exp(-i\epsilon)} \right|^2 \\[6pt] r_1 = \dfrac{n_I - n_{II}}{n_I + n_{II}} \\[6pt] r_2 = \dfrac{n_{II} - n_{III}}{n_{II} + n_{III}} \\[6pt] \epsilon = 4\pi \cdot \dfrac{h}{\lambda} \cdot n_{II} = 4\pi \cdot \dfrac{h}{\lambda} \cdot (n_0 + n_2 I_{in}) \\[6pt] \therefore R = R\left(I_{in}, \dfrac{h}{\lambda}\right) \end{array} \right\} \qquad (2)$$

where $r_1$ is a first Fresnel's amplitude reflectance in the interface between the first transparent film and the reflection film, $r_2$ is a second Fresnel's amplitude reflectance in the interface between the reflection film and the second transparent film, $n_I$ is a first refractive index of the first transparent film, $n_{III}$ is a second refractive index of the second transparent film, h is a thickness of the reflection film, and $\lambda$ is a wavelength of said incident light; and said reflection film having the thickness h satisfying the following inequalities:

$$\dfrac{dR\left(I_{in}, \dfrac{h}{\lambda}\right)}{dI_{in}} \geq 0$$

$$I_e \leq I_{in} \leq I_o$$

where $I_o$ and $I_e$ are center and peripheral intensities of said main lobe respectively.

2. An optical disk according to claim 1, wherein said reflection film is irradiated by a laser beam through said first transparent film and then the diffraction spot having an intensity distribution presented by a Bessel function is formed on the surface.

* * * * *